United States Patent [19]
Davis

[11] Patent Number: 5,526,685
[45] Date of Patent: Jun. 18, 1996

[54] FLUID FLOW RATE MEASURING AND CONTROLLING APPARATUS AND METHOD FOR USING SAME

[75] Inventor: Homer W. Davis, Atlanta, Ga.

[73] Assignee: Graseby Andersen Inc., Smyrna, Ga.

[21] Appl. No.: 373,589

[22] Filed: Jan. 17, 1995

[51] Int. Cl.[6] ............................................ G01F 3/20
[52] U.S. Cl. ........................................ 73/262; 73/279
[58] Field of Search ........................... 73/861, 243, 249, 73/262, 263, 264, 270, 273, 274, 279

[56] References Cited

U.S. PATENT DOCUMENTS

| | | | |
|---|---|---|---|
| 2,619,940 | 12/1952 | Leroy | 73/263 |
| 2,742,785 | 4/1956 | St. Clair | 73/279 |
| 3,415,121 | 12/1968 | Douglas | 73/274 |
| 5,027,661 | 7/1991 | Desaulniers et al. | 73/861 |
| 5,056,036 | 10/1991 | Van Bork | 364/510 |
| 5,109,711 | 5/1992 | Wendt | 73/863.03 |

Primary Examiner—Richard Chilcot
Assistant Examiner—Max H. Noori
Attorney, Agent, or Firm—Jones & Askew

[57] ABSTRACT

A volumetric flow control apparatus and method for measuring and controlling the volumetric flow rate and flow volume of a fluid. The apparatus comprises a reciprocating diaphragm meter having a diaphragm mounted for reciprocating movement and a diaphragm position indicator assembly for monitoring the position of the diaphragm as it reciprocates. As a fluid under pressure passes through the reciprocating diaphragm meter the diaphragm reciprocates through at least one meter cycle during which the meter passes a fixed volume of fluid per meter cycle. A timer responsive to the diaphragm position indicator is provided to measure the elapsed time for the meter diaphragm to reciprocate through at least one meter cycle. A processor calculates the volume flow rate of the fluid passing through the reciprocating diaphragm meter by dividing the fixed volume of fluid passed by the meter in a meter cycle by the elapsed time measured during the meter cycle. The volume flow rate of fluid passing through the reciprocating diaphragm meter is controlled by a controller which compares the measured flow rate to a desired flow rate and then causes the pressure differential across the reciprocating diaphragm meter to be changed to increase or decrease the fluid flow rate.

8 Claims, 4 Drawing Sheets

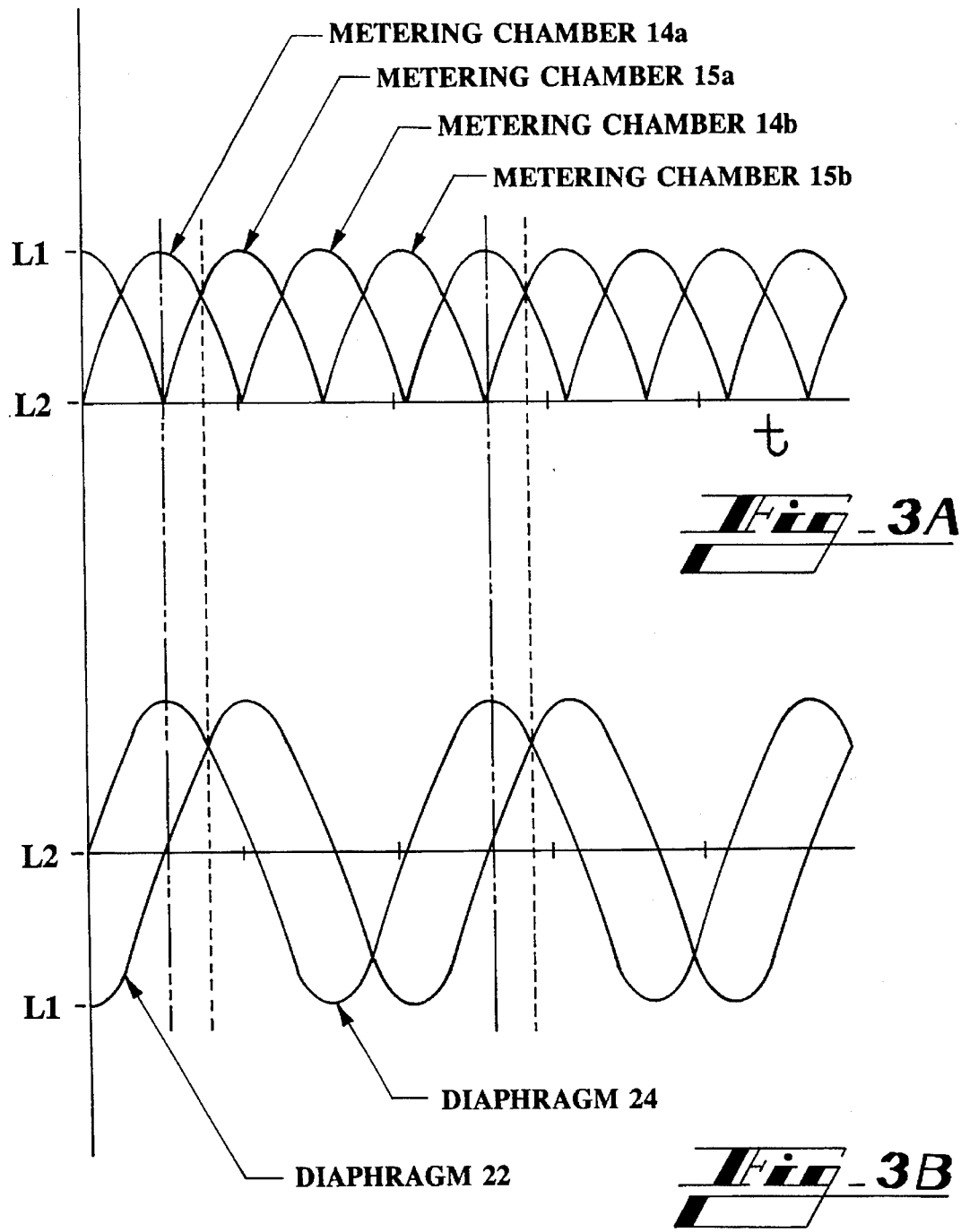

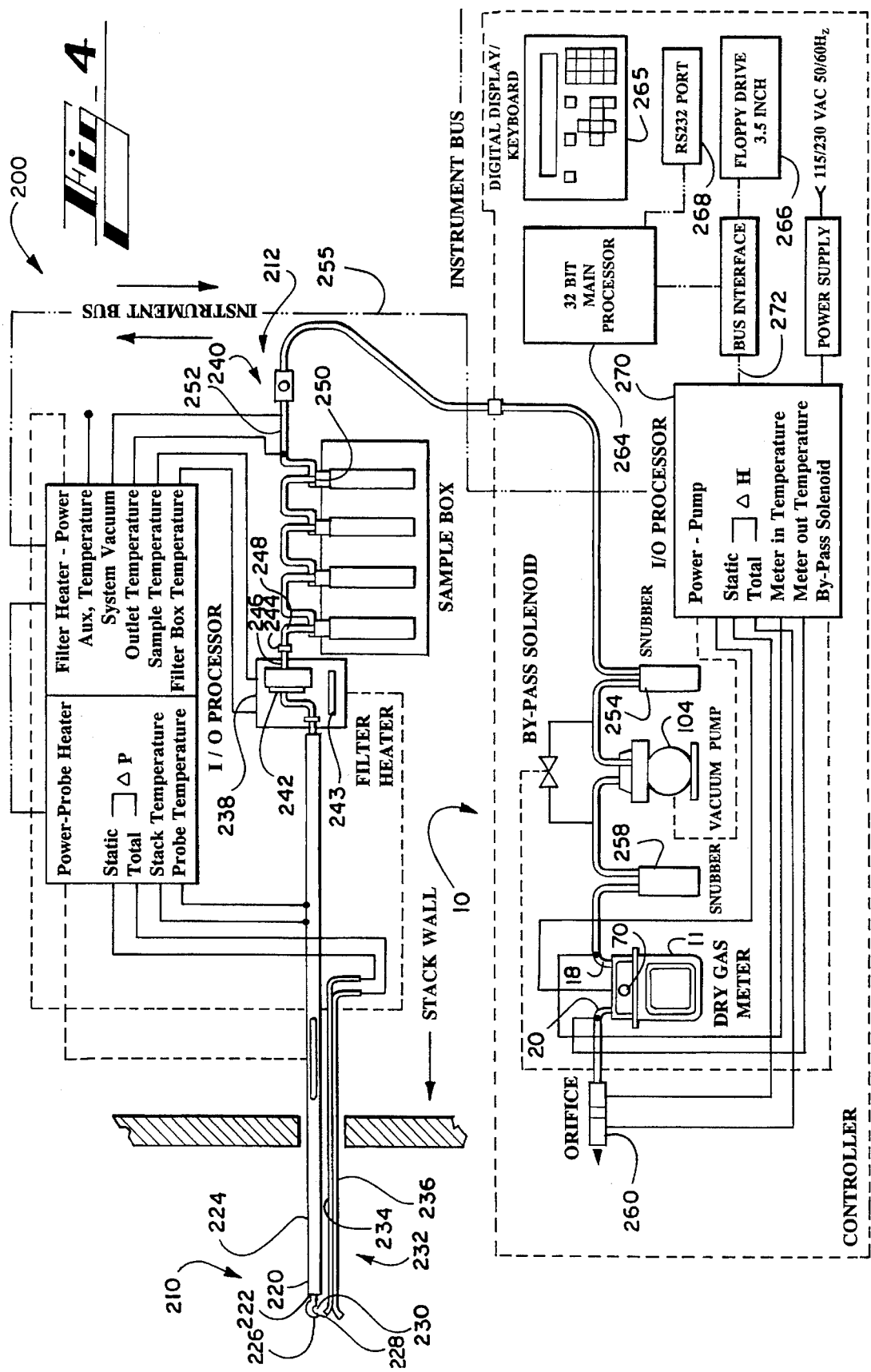

FLUID FLOW RATE MEASURING AND CONTROLLING APPARATUS AND METHOD FOR USING SAME

TECHNICAL FIELD

This invention relates to an apparatus and method for measuring and controlling volumetric flow rates of a fluid and more particularly to an apparatus and method for measuring and controlling the volumetric flow rate of a fluid and a method and system for using the apparatus to draw a fluid sample from a fluid source.

BACKGROUND OF THE INVENTION

Many industrial processes and analytical procedures require a flow of fluids, including industrial and analytical gases, which are used as fuels, heat transfer media, and transfer media for particulate source sampling, for example. These fluids must often be provided at controlled rates of flow. Thus, for example, a gaseous fuel such as natural gas is supplied to a gas burner at a precise, controlled volumetric flow rate to ensure stoichiometric operation of the burner. Process gases, including stack effluent gases, often contain reactive materials and contaminants which are the subject of analytical procedures conducted for the purpose of process optimization and pollution control. The analytical procedures used to test for these materials usually include withdrawing a known volume of the gases and then measuring the concentration of reactive materials and contaminants contained in these samples. Samples of stack effluent gas are usually taken by inserting a tubular probe into a stack and then drawing the sample through the probe.

In order to obtain a gas sample that is representative of the effluent stack gases as a whole, the velocity of the gas at the entrance to the sample probe must be identical to the velocity of the gas flow in the region of the stack adjacent the sample probe, a condition referred to as isokinetic sampling. This is especially true where particulate emissions are the subject of the stack testing. If the sample flow rate is higher than the isokinetic rate, the sample will contain a lower concentration of large particles. Conversely, if the sample flow rate is lower than the isokinetic rate, the sample will contain a high concentration of large particles. This is because the motion of particles entrained in the stack effluent gas depends, among other things, on the aerodynamic diameter of the particles and the velocity of the gas medium.

The aerodynamic diameter of a particle is a calculated effective equivalent diameter used to predict motion of particles in fluids and is a function of the actual particulate diameter and the particle density, size, surface contour and shape. Thus, a fibrous material, asbestos for example, may have a relatively high aerodynamic diameter and exhibit motion in a suspending gas different from a material of similar density because of the fibrous nature of the material. When the flow of the gas sample at the probe entrance equals the flow velocity of the stack gases adjacent to the probe isokinetic sampling conditions are said to be achieved. Also, because the stack flow velocity may not remain constant over time the sample probe flow velocity must be changed, in real time, to equal the stack velocity so that a representative sample of gas may be withdrawn through the sample probe.

Before the volume and flow rate of gases can be controlled to desired values they must first be measured. Devices for measuring and controlling the volume flow rate of gas in industrial processes and analytical procedures include mass flow controllers and volumetric flow controllers. Mass flow controllers measure the actual mass of gases flowing through a conduit. The volumetric flow rate of the gas can be estimated by converting the mass flow to volume using well known gas relationships based upon the molecular weight, temperature and pressure of the gas. Since estimating the volumetric flow rate with these types of flow controllers depends on the molecular weight, temperature and pressure, all of which may vary during an analytical procedure, they tend to exhibit inaccuracies in the range of 3–5%.

Volumetric flow controllers measure directly the volume flow rate of gases passing through a conduit, for example. Volumetric flow controllers include differential pressure flow meters and area flow meters. Differential pressure flow meters include venturi meters, which are often called orifice meters. Venturi meters are tubular devices, having a constricted flow region, through which the gas sample flows to provide a measure of the volume flow rate. A pressure drop occurs down stream of the constricted region relative to the pressure up stream of the constriction. The magnitude of the pressure difference is proportional to the volume flow rate of gas flowing through the venturi. The ability to derive accurate flow rate measurements from venturi flow meters depends on rigorous calibration procedures applied to the venturi flow meter. Once properly calibrated these meters provide a quantitative measure of the flow rate by measuring the pressure drop across the venturi and correlating the pressure drop to an empirically determined flow rate. The pressure drop is typically measured by a differential pressure cell or by a liquid manometer. A desired constant gas flow rate is maintained by maintaining a constant pressure drop across the venturi flow meter.

Area flow controllers are commonly called rotameters. A rotameter is a fluid flow rate controller having a vertically positioned flow tube with a tapered bore. A flow, residing within the tapered bore, rises in the bore as gas is allowed to pass through the meter. The rising float defines an increasing annular gap between the tapered bore and the perimeter of the float. The height to which the float rises gives an indication of the volume flow rate of gas through the bore. The float height is correlated to the volumetric flow rate by calibration procedures. A constant volume flow rate of gas through the rotameter is maintained by maintaining the float at a constant bore height. Rigorous calibration of the rotameter is required to insure accurate flow rate indication.

Both the venturi and rotameter flow controllers are susceptible to contamination of the constricted region, in the case of the venturi meter, and the annular bypass area defined between the rotameter float and bore in the case of the rotameter. These types of volumetric flow meters have inherent errors in the measurement principal resulting in 3 to 5% error of actual flow rates and flow rate control.

Neither the mass flow controllers nor the volumetric flow controllers provide real time quantitative information regarding the total volume of gas delivered. However, it is often necessary to determine the total volume of gas that has been delivered to an industrial process or drawn as a sample in an analytical procedure. For example, as discussed above, stack emissions are often tested for the amount of particulate per unit volume of gas flowing through the stack. Therefore, it is necessary that a known volume of gas be sampled and then analyzed for its particulate content. The above-described volume flow rate meters only provide total volume information indirectly by multiplying the flow rate information by a flow time period. Timing inaccuracies may combine with the inaccuracies present in the above described volumetric flow rate meters such that test results are less than reliable and perhaps useless for some analytical procedures.

Another type of flow meter, a positive displacement meter, provides very accurate measurement of total flow volume. Positive displacement meters include reciprocating diaphragm meters and wet gas meters. One type of reciprocating diaphragm meter is a dry gas meter for metering gases. Reciprocating diaphragm meters comprise a meter chamber separated into opposing metering chambers by a diaphragm mounted for reciprocating movement within the chamber. A shuttle valve assembly alternately places one of the metering chambers in fluid communication with a source of gas at a high pressure introduced through a gas inlet of the meter. The shuttle valve assembly places the opposed metering chamber in fluid communication with a gas outlet of the meter which is at a low pressure relative to the source gas. The high pressure gas causes the diaphragm to travel into the metering chamber maintained at low pressure thereby expelling or exhausting gas from the low pressure metering chamber. The diaphragm reaches the end of its travel within the chamber and then the shuttle valve trips to now place the heretofore low pressure metering chamber in fluid communication with the high pressure gas source and the heretofore high pressure metering chamber in fluid communication with the gas outlet. Therefore the diaphragm now travels in the opposite direction exhausting the gas from the metering chamber. Reciprocating diaphragm meters are often configured with two chambers, each mounting a diaphragm and adapted to reciprocate a predetermined phase angle out of phase. This configuration prevents the shuttle valve from stalling, decreases the dwell time of the shuttle valves and provides a more constant flow of gas rather than a pulsed flow that is typical of single chamber reciprocating diaphragm meters.

In a dry gas meter and other reciprocating diaphragm meters, a fixed volume of gas passing through the meter will produce a fixed movement of a diaphragm mounted in a metering chamber which in turn causes a fixed incremental change in a registration device associated with the meter, such as a system of dials or a counter similar to an automobile odometer. Because dry gas meters are positive displacement devices the incremental change in the registration device is solely a function of the passage of a fixed volume of gas through the device and is not a function of time, per se. The calibration necessary for positive displacement meters is very simple because a known volume of a gas passed through the meter will produce a known displacement of the meter mechanism. Also, dry gas meters tend to be relatively insensitive to temperature and pressure changes of the metered gas.

Positive displacement meters are not adapted for providing real-time flow rate information, however. Volumetric flow rate information is derived by dividing the accumulated volume of gas metered by the positive displacement meter by an extended time interval over which the total volume flowed. Where real time volumetric flow rate information is needed for process control or analytical procedures a calculated flow rate as described above may not be useful.

In some industrial processes and analytical procedures it is necessary to measure and control both the instantaneous gas flow rate and the total gas flow volume. For example, the United States Environmental Protection Agency (EPA) has promulgated various reference methods for measuring specific pollutant emissions from industrial or utility smoke stacks. One of these reference methods is referred to as Reference Method 5 and is widely used for measuring particulate matter emissions from industrial and utility smoke stacks. The design criteria for an instrument suitable for carrying out analytical procedures pursuant to the EPA requirements for Reference Method 5 are codified in the Code of Federal Regulations, 40 C.F.R. §60, app. A. This regulation requires the use of a dry gas meter for volume flow measurements and a venturi meter for flow rate measurements. The flow rate meters and dry gas meters are used in tandem to measure the rate and volume of gas flow with the required accuracy. But there are problems with this tandem set-up of flow meters. The orifice flow meter requires extensive calibration and is susceptible to inaccuracy because of its non-linearity and its sensitivity to contamination of the constricted region. Thus, although flow measurement and control may be realized with this tandem set up, it does so at the expense of increased cost for instrumentation, calibration and operation. What is needed and what is not available is an apparatus that can function as a gas flow rate meter and a total gas volume meter.

SUMMARY OF THE PRESENT INVENTION

The present invention solves the above described problems in the art by providing a fluid meter capable of providing real time fluid flow and fluid volume measurements. This is accomplished by interpreting the motion of a periodically moving component of a positive displacement fluid meter to provide total flow volume and flow rate information.

Generally described the apparatus of the present invention provides an apparatus and method for measuring, in real time, the flow rate and the total volume of a fluid, such as a gas passing through the apparatus. In a preferred embodiment of the present invention, information regarding the measured flow rate and total volume of fluid is utilized to control the rate and volume of the fluid passing through the apparatus.

More particularly described, the apparatus of the present invention includes a reciprocating diaphragm meter comprising a housing having a gas inlet and a gas outlet in fluid communication with an internal chamber defined within the gas meter. Gas to be measured enters the gas meter through the gas inlet and exhausts through the gas outlet. A diaphragm disposed in the housing separates the internal chamber into opposed metering chambers and a valve directs the gas in communication with the gas inlet into one of the chambers and directs the gas in the opposing chamber to the gas outlet thereby expelling the gas. The valve then alternates the metering chambers between being in fluid communication with the gas inlet and the gas outlet so that the gas pressure against the diaphragm of the metering chamber in fluid communication with the gas inlet forces the gas in the opposed metering chamber through the gas outlet.

The apparatus further includes a diaphragm position indicator that is mechanically interconnected to the diaphragm. The position of the position indicator correlates to the position of the diaphragm and therefore provides information regarding the diaphragm position relative to the metering chambers and the volume of the metering chamber displaced by the diaphragm. The diaphragm movement is periodic and intakes and exhausts a fixed volume of gas during every periodic movement of the diaphragm. The position indicator motion, being dependent on the position of the diaphragm is likewise periodic. Therefore, a periodic movement of the position indicator indicates the intake and exhaust of a fixed volume of gas.

The apparatus further includes a flow indicator transducer operatively engaged with the diaphragm position indicator. The flow indicator transducer provides an output correlated to the position of the diaphragm relative to the internal chamber. A processor receives the transducer output and calculates an elapsed time for the diaphragm to move though a periodic motion. The processor then calculates a volumetric fluid flow rate by dividing a gas volume associated with a periodic movement of the diaphragm, which is constant within the operating range of the gas meter, by the elapsed time for the diaphragm to move through the period. In a preferred embodiment display means are provided for providing a perceptible indication of the volumetric fluid flow rate of gas through the dry gas meter. Means are also provided for counting cumulative periodic movements of the diaphragm position indicator which correlates to the total gas volume metered through the pump.

The method of the present invention includes the steps of monitoring diaphragm position, measuring time for a cyclic diaphragm movement, and calculating flow rate from a known periodic volume delivered during the cyclic movement at least as often as every cyclic movement.

Preferably, sequential time measurements of incremental diaphragm movements are taken and summed until the diaphragm has moved through a complete period movement. The volume of gas displaced by a periodic movement of the diaphragm is constant within a defined operating range of the meter regardless of the particular point taken as the beginning of the periodic movement of the diaphragm. The constant volume of gas displaced for a periodic movement of gas is divided by the sum of the sequential time measurements of the incremental diaphragm movements for a periodic diaphragm movement to derive an initial fluid flow rate. A moving average of elapsed time for a periodic cycle is maintained to provide a real time volume flow rate measurement.

Thus, it is an object of the present invention to provide an apparatus and method for measuring the volumetric flow rate of a fluid.

It is a further object of the present invention to provide an apparatus and method for measuring and controlling the volumetric flow rate of a fluid.

It is another object of the present invention to provide an apparatus and method for obtaining a fluid sample from a fluid source at a controlled volumetric flow rate of the sample from the fluid sample source.

Other objects, advantages and features of the present invention will be more readily understood from the following detailed description of specific embodiments thereof when read in conjunction with the accompanying drawings.

BRIEF DESCRIPTION OF THE DRAWINGS

FIG. 3a is a graphical representation showing the fluid flow from a dry gas meter as a function of time;

FIG. 3b is a graphical representation of the position of the diaphragms of the dry gas meter as a function of time; and FIG. 4 is a schematic illustration of a fluid sampling system utilizing a dry gas meter adapted to provide volumetric fluid flow rate measurement and control.

DETAILED DESCRIPTION OF THE PREFERRED EMBODIMENT

Figure 1:
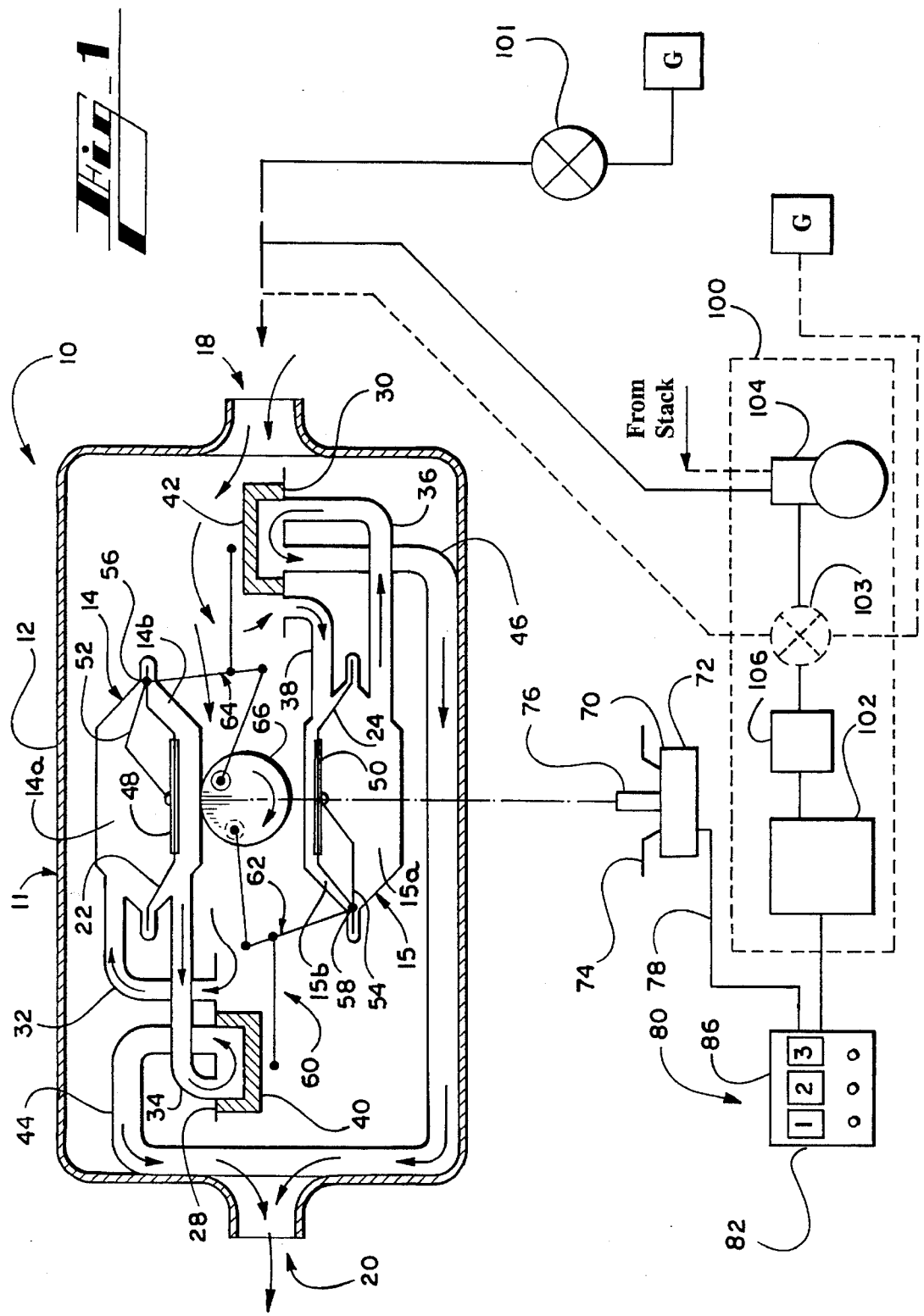
FIG. 1 is a schematic illustration of a flow rate measuring apparatus utilizing a dry gas meter adapted to provide volumetric fluid flow rate information.

Referring now in more detail to the drawings, in which like numerals refer to like parts throughout the several views, FIG. 1 shows a schematic illustration of a flow rate measuring and controlling apparatus 10 embodying the present invention. The flow rate measuring apparatus 10 includes a dry gas meter which is generally designated by the numeral 11. The dry gas meter 11 includes a meter housing 12 which defines a pair of chambers 14 and 15, a gas inlet 18 and a metered gas outlet 20. Diaphragms 22 and 24 are disposed within the chambers 14 and 15 and divide them into metering chambers 14a and 14b and 15a and 15b. The diaphragms 22 and 24 move in periodic motion under the influence of pressurized gas applied alternately to the opposing surfaces of the diaphragms 22 and 24 by the selective introduction of gas into the metering chambers 14a, 14b, 15a, and 15b in a manner known to those skilled in the art. The diaphragms 22 and 24 move to alternate sides of a centerline through fixed excursions.

The diaphragms 22 and 24 are moved through one periodic excursion (also referred to as a cycle) by causing gas to fill one of the metering chambers of each of the chambers while at the same time allowing the opposed metering chamber of the same chamber to exhaust gas residing in the metering chamber as the diaphragm 22 or 24 moves into that metering chamber.

The metering chambers 14a and 14b are disposed in fluid communication with valve manifold 28 through conduits 32 and 34. Similarly, metering chambers 15a and 15b are disposed in fluid communication with valve manifold 30 through conduits 36 and 38. The gas inlet 18 is selectively and alternately disposed in fluid communication with the conduits 32 and 38, or 34 and 36, by sliding valve gates 40 and 42 along the valve manifolds 28 and 30. The valve gate 40 also selectively disposes the gas outlet 20 in fluid communication with the metering chambers 14a and 14b through outlet conduit 44 by selectively connecting outlet conduit 44 to either conduit 32 or conduit 34. Similarly, the valve gate 42 selectively disposes the gas outlet 20 in fluid communication with the metering chambers 15a and 15b through outlet conduits 46 by selectively connecting outlet conduit 46 to either conduit 36 or conduit 38.

Mounted on the diaphragms 22 and 24 are diaphragm supports 48 and 50 which provide rigidity to a central portion of the diaphragms 22 and 24, respectively, and provide a site for connecting diaphragm linkages 52 and 54, respectively. As will be explained in more detail below the diaphragm linkages 52 and 54 act as followers of the motion of the supports 48 and 50 as the diaphragms are caused to move within the cambers 14 and 15. Upstanding linkage rods 56 and 58 are coupled to the diaphragms 22 and 24, and are pivotally mounted to the chambers 14 and 15, respectively. The linkage rods 56 and 58 extend upwardly out of the chambers 14 and 15. Because the linkage rods 56 and 58 are coupled to the diaphragms 22 and 24 through diaphragm linkages 52 and 54, the linkage rods 56 and 58 rotate reciprocally as the diaphragms 22 and 24 move cyclically. The motion of the linkage rods 56 and 58 defines a given angular displacement about the longitudinal axis of the rods 56 and 58.

A valve actuator and synchronization mechanism 60 operatively interconnects the linkage rods 56 and 58 with the valve gates 40 and 42 so that the diaphragm movement is coupled and synchronized to and with the valve gate movement to cause the dry gas meter 11 to actually pump fluid from the gas inlet 18 through to the gas outlet 20. The valve actuator and synchronization mechanism 60 includes opposed three-bar linkages 62 and 64 coupled to a crank hub 66. The crank hub assembly 66 rotates in response to the reciprocating motion of the linkage rods 56 and 58 coupled to the hub 66 through the three-bar linkages 62 and 64. The interconnection of the diaphragm linkages 52 and 54, the linkage rods 56 and 58 and the three-bar mechanisms 62 and 64 causes the diaphragms 22 and 24 to move in synchronization with each other and the valve gates 40 and 42. Also, a full, 360 degree rotation of the crank hub assembly corresponds to a complete cycle of both of the diaphragms 22 and 24 regardless of the initial position of the diaphragms 22 and 24.

The flow rate measuring apparatus 10 also includes a transducer 70 for indicating the angular displacement of the crank hub 66. In the preferred embodiment of the present invention the transducer 70 is an optically coupled rotary encoder that employs an electro-optic switch encased in the encoder body, and therefore not shown, to measure angular displacement. The encoder 70 includes an encoder case 72 and a mount 74 for rigidly mounting the encoder case to the meter housing 12. A shaft 76 is supported by and extends from the case to the crank hub 66, with which the shaft 76 rotates. The shaft 76 transfers the rotary motion of the hub 66 to the electro-optic switch. A cable 78 transmits the encoder output to an external processor 80. Optical encoders having analog or digital output formats are available. In the preferred embodiment of the present invention the output of the encoder 70 is digital and provides two square waves in quadrature with a resolution of 32 pulses-per-revolution. It should be understood, however, that transducers having resolutions greater than or less than 32 pulses-per-revolution may be adapted to the dry gas meter 11 as required for desired system accuracy. A full rotation of the shaft 76, which corresponds to a full rotation of the crank hub 66, provides an exact integer number of pulses produced by the transducer 70, which, in the preferred embodiment of the present invention, is exactly 32 pulses per crank hub rotation. Each transducer pulse corresponds to an equal angular displacement of the crank hub 66. Each pulse is transmitted to the processor 80.

Figure 2:
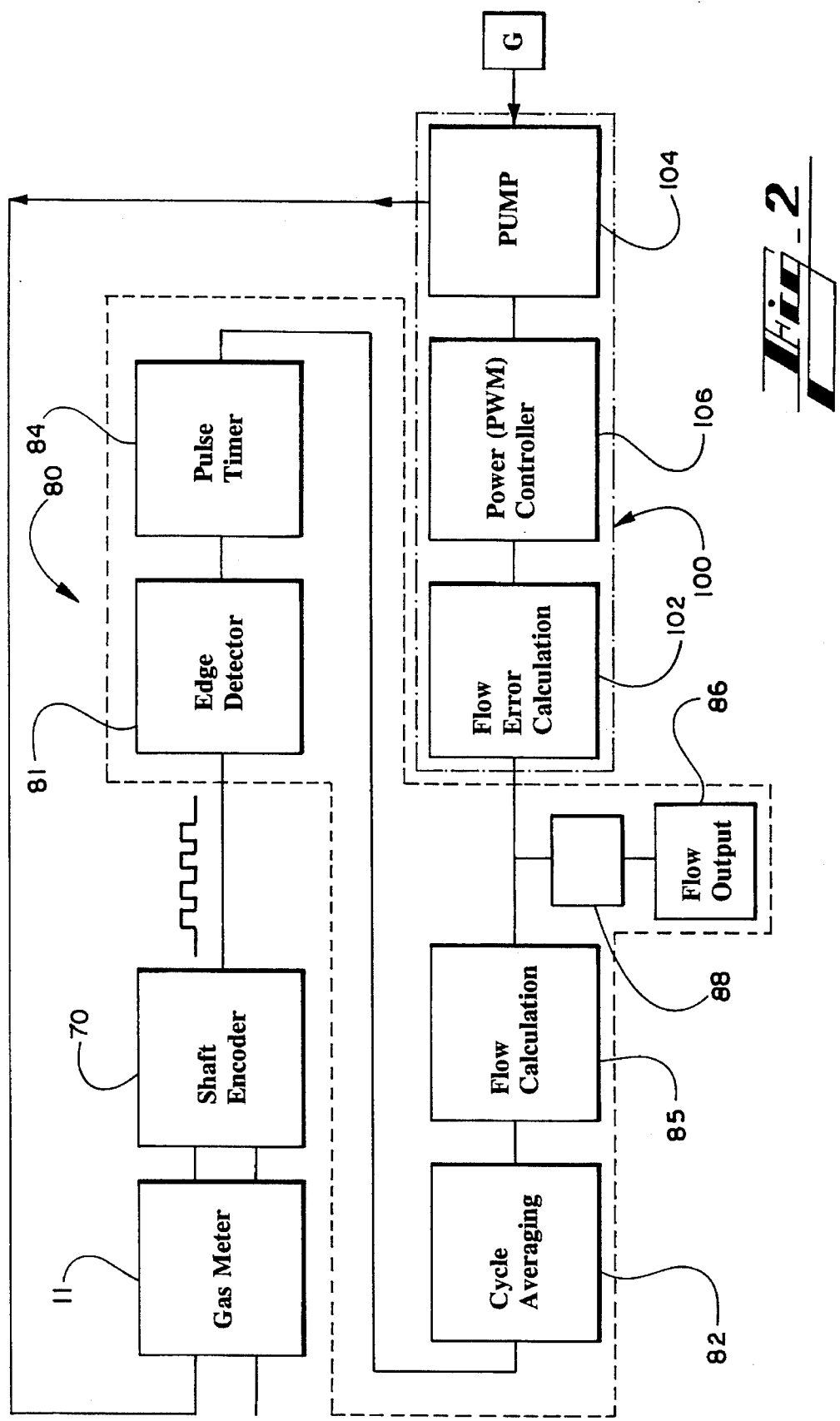
FIG. 2 is a block diagram illustrating elements of a fluid flow rate measuring and controlling apparatus embodying the invention.

The flow rate measuring and control apparatus 10 is shown in FIG. 2 as a block diagram illustrating the sequence of measuring and control operations. In the preferred embodiment of the present invention the processor 80 includes an edge detection circuit 81, a cycle averaging circuit 82, a pulse timer circuit 84, a flow calculation circuit 85 and a flow output indicator 86. The edge detection circuit 81 interfaces directly with the output signal of the transducer 70 and is provided to sense the rising edge of a square wave pulse transmitted by the encoder transducer 70. Each time a pulse edge is sensed, the pulse timer circuit 84 is read and cleared yielding the elapsed time interval since the last pulse. As will be described in more detail below, the elapsed time information for each of a successive number of pulses is transmitted to the cycle averaging circuit 82 which counts the total number of pulses and sums the elapsed time measured in the pulse timing circuit 84 for a sequential group of 32 pulses. The pulse count number and the elapsed time sum are provided to the flow calculation circuit 85 which calculates the total flow volume, utilizing the pulse count number, and the real time volumetric fluid flow rate, utilizing the elapsed time sum.

The total flow volume and gas flow rate results may be displayed on a readout 86 supported by the processor 80. The readout 86 may be, for example, a seven segment liquid crystal or light emitting diode (LED) numerical readout. In addition, the processor 80 may also contain a memory 88 for storing prior fluid flow rate and total fluid volume readings. Additionally, the processor 80 may be adapted to determine statistical information including, average, median and standard deviation statistics for the flow rate and gas volume delivered. These figures may be stored in the memory 88 and then printed, or other wise rendered in a usable format, on request. For example, the real time values for fluid flow rate and the statistical measurements may also be adapted to be displayed for presentation on display devices including strip chart recorders, two axis pin plotters or disk chart recorders. These modes of display provide real-time, graphical presentation of the data. The readout 86 is provided with an initializing circuit to reset all measurements to zero so that prior readings will not influence future readings. This is particularly helpful when the apparatus is being calibrated, is out of range, or when inaccurate readings have been received by the processor which, if allowed to remain in the flow rate calculation, would skew the results and make them inaccurate.

As described above, the flow rate and total flow volume during certain analytical procedures must be controlled to a standard flow rate and volume delivered. In this case means must be provided to actively control the volume flow rate and total volume of gas pumped or drawn through the system. For example, some tests of stack effluent require that isokinetic test conditions be established for test validity. The same test may also require that a predetermined volume of gas be drawn from the stack effluent for the purpose of measuring the quantity of pollutants per standard volume of effluent gas.

Accordingly, the flow rate measuring and controlling apparatus 10 is also capable of functioning as a volume flow rate and, total volume controller as shown in FIG. 1 and 2 by providing a controller arrangement 100. The controller arrangement 100 includes a comparator 102, and a power controller 106 connected to control a flow controlling device such as a vacuum pump 104 for regulating the flow of gas through the dry gas meter 11. It is important to understand that the dry gas meter 11 is only a measuring device and thus is not capable of controlling directly the gas flow rate drawn through the dry gas meter 11 within the operating range of the dry gas meter 11. Therefore, the dry gas meter 11 is used in a system that controls the fluid flow rate by causing the gas meter 11 to control other devices that are capable of directly controlling the gas flow and the gas flow rate. This is accomplished by the vacuum pump 104, which directly controls the fluid flow rate in response to the signal provided by the transducer 70 of the dry gas meter 11. In an alternative embodiment of a flow control system for controlling an external source of pressurized fluid G, a solenoid valve 103 (shown in phantom lines in FIG. 1) responsive to a control signal provided by the comparator 102 may be used to vary the pressure of gas at the gas inlet 18 of the dry gas meter 11.

The fluid flow rate may also be controlled manually in response to the fluid flow rate information displayed by the readout 86 of the processor 80. Manual control of the fluid flow rate of the fluid metered by the dry gas meter 11 is accomplished by providing a manually adjustable valve 101 controlling a pressurized source of fluid G similar to the solenoid valve 103 except for its manual operation. An operator observes the fluid flow reading displayed on the readout 86 and then manually adjusts the fluid flow of the pressurized source G of fluid until the desired flow rate appears on the readout 86. Alternatively, a manually adjustable electrical voltage or power controller may be adapted to the pump 104 for manual operation of the pump 104. To control the fluid flow rate to a desired level, an operator would adjust the manual electrical controller to adjust the pumping rate of the pump 104 until the desired fluid flow rate reading is observed on the processor readout 86.

The processor 80 provides a processor output signal corresponding to the flow rate and the total flow volume to the comparator 102. The comparator, or flow error correction circuit 102 compares the actual flow rate and flow volume of fluid metered by the dry gas meter 11, measured by the processor 80, to setpoint values for desired flow rate and flow volume. The setpoint values are programmed into the comparator 102 by various means including panel switches or by a computer with which the comparator 102 may be interfaced. If the comparator 102 determines a difference between the actual fluid flow rate and the desired flow rate, the comparator 102 generates a flow error calculation signal which is sent to the power controller 106 which directly controls the pumping rate of the pump 104.

The power controller 106 is a power interface circuit that interfaces the comparator 102 with the pump 104 to control the pumping rate of the pump 104. Where the pump 104 is a simple DC pump, the power controller 106 need only vary the magnitude of the DC voltage to the pump motor of the pump 104 in proportion to the magnitude of the flow error calculation signal. Thus, if the actual flow rate is lower than the desired flow rate the flow error calculation signal would be large in magnitude which would cause the power controller to issue a large magnitude error correction DC voltage. This would cause the vacuum pump 104 to increase its pumping rate resulting in a greater volume of fluid metered by the dry gas meter 11. This causes the cycling rate of the diaphragms 22 and 24 to increase which causes the sum of the pulse time periods to decrease thereby indicating an increased actual fluid flow rate. The comparator 102 may be a proportional comparator which provides an output signal, the strength of which is proportional to the difference between the actual flow rate and the desired flow rate. The comparator 102 may also be configured to provide integral control in which the signal changes at a rate proportional to the difference between the desired and actual flow rates.

In the preferred embodiment, the pump 104 is a DC powered device which is regulated by pulse width modulation of the input DC voltage. This method is well known in the art and is particularly suited to applications which incorporate automatic control feedback loops for controlling electrical equipment. In this case, the power controller 106 is a pulse width modulation controller which modulates the pulse width of the DC electric signal in response to the magnitude of the flow error calculation signal, thereby increasing, or decreasing, the pumping rate of the pump 104.

The vacuum pump 104 is a single diaphragm vacuum pump having its high pressure outlet in fluid communication with the inlet 18 of the dry gas meter 11 and its low pressure inlet in fluid communication with a flow of gas, such as a flow of stack gases drawn from an industrial exhaust stack, which is to be controlled. In one embodiment the vacuum pump 104 is capable of achieving an air flow of 0.75 CFM at 15 inches of mercury vacuum.

The comparator 102 and the processor 80 may comprise discrete components, a single integrated electronic component, or be fully embodied in a central processing unit (CPU) of another control system which will be explained in more detail below. The processor 80 and the comparator 102 are typically mounted in a field case for in-the-field use, separate from the dry gas meter 11 and the vacuum pump 104.

A fluid sampling system 200 utilizing a flow rate and flow volume control system 10 which incorporates a dry gas meter 11 according to the present invention is shown in FIG. 4. The fluid sampling system 200 includes a flow rate measuring and controlling apparatus 10, a probe assembly 210 and a sample extraction assembly 212. The probe assembly 210 is shown inserted into an industrial stack S.

The probe assembly 210 includes a probe tube arrangement 220, which extends horizontally through the stack wall, comprises a probe tube 222 encased within a probe heater jacket 224 that extends substantially the entire length of the probe tube 222. The heater jacket 224 heats the probe tube 222 to prevent condensation of the stack gases along the inner probe wall. The heater jacket 224 is controlled through a feedback loop of the flow rate measuring and control apparatus 10 which will be explained in more detail below. The probe tube 222 has a semicircularly shaped entry end 226 defining a downwardly oriented entry orifice 228 through which stack gases are drawn for sampling.

A stack thermocouple 230 extends through the probe heater and terminates adjacent the entry end 226 of the probe tube 222 and provides stack temperature measurements at the sample withdrawal site. A pitot tube arrangement 232 comprising static and total pressure pitot tubes 234 and 236 respectively extends along the probe tube arrangement 220 and measures the pressure in the stack at the sample site. The static and total pressure measurements, which are monitored by electronic pressure transducers, provide a pressure differential from which the velocity of the stack gases may be determined. The velocity of the stack gases must be known so that isokinetic sample conditions may be established.

The sample extraction assembly includes a heated filter assembly 238 and a condenser assembly 240. The filter assembly includes a filter housing 242 having an inlet fitting which attaches in fluid communication with the probe tube 222. A particulate filter (not shown) is mounted within the filter housing 242 and is effective to remove solid particulate entrained in the sample gases drawn through the probe tube 222. The filter housing is heated by a filter heater 243 to prevent condensation of high boiling point gases from the gas stream in the filter housing 242. The filter heater 243 is controlled by a closed loop controller included in the flow rate measuring and controlling apparatus 10 which will be explained in more detail below. An outlet fitting 244 connects the filter outlet 246 to the condenser inlet 248 of the condenser assembly 240.

The condenser assembly 240 includes a plurality of sample impingers 250 arranged in series for reducing the temperature of the sample gases to remove moisture and other high boiling point fluids from the sample gas stream. The fluids are removed to prevent damage to system components including the dry gas meter 11 and vacuum pump 104. Also, the removed fluids may be retrieved and be subjected to chemical analysis to provide information regarding stack gas composition. Temperature transducers monitor the temperature of the filter housing, the sample temperature and the outlet sample temperature at the impinger exit conduit 252. The output of the temperature transducers along with the pitot tube pressure transducers, stack temperature transducers are terminated at a sample extraction assembly I/O processor 253 which communicates with the flow rate measuring and controlling apparatus 10 through an instrument bus 255.

In the flow rate measuring and controlling apparatus 10 of the fluid sampling system 200 the measuring and control functions have been consolidated in a 32 bit main processor 264 which is a programmable microprocessor computer. The processor 264 includes control capabilities that combines the functions of the above described processor 80 and controller 100. The computer 264 is capable of receiving encoded data signals from the transducer 70 and calculating the gas flow rate and total gas flow volume. To perform the comparator and power control functions of the comparator 102 described above, the computer 264 is programmed with a setpoint flow rate and flow volume. The computer 264 then compares the setpoint values to the actual flow rates and flow volumes measured by the processor 264 from information provided by the transducer 70 of the dry gas meter 10 and generates a flow error calculation signal. The flow error correction signal provides a controlled DC voltage to the pump 104 for regulating the pumping rate of the pump 104.

Additionally, the computer 264 is capable of processing information received from temperature and pressure transducers monitoring the probe assembly 210 and the sample extraction assembly 212 communicated to the computer 264 via the instrument bus 255.

The flow rate measuring and controlling apparatus 10 further includes a first gas flow snubber 254 which communicates with the impingers 250 through an exit conduit 252. In a well known manner, the snubber 254 reduces the pulsation of fluid flow drawn through the system 200 by the vacuum pump 104. The pump 104 is operated to achieve, as necessary, isokinetic stack gas sampling and the snubber 254 helps achieve that condition by smoothing the gas flow. The low pressure side of the vacuum pump 104 communicates with the snubber 254. The high pressure outlet of the pump 104 communicates with a second gas flow snubber 258 which, like the snubber 254, acts to smooth the pulsation of the pumped gases leaving the pump 104 before entering the dry gas meter 11.

The computer 264 is supported by a digital display/keyboard 265, a floppy disk drive 266 and an RS232 port 268. The display/keyboard 265 is useful for inputting setpoint values and other test information necessary to set-up the system 200 for particular sampling procedures and operating conditions. The display/keyboard 265 also includes the function of the display 86 of the processor 80 in that volume flow rate and total flow volume information is displayable on the display/keyboard 265, as well as other information.

The floppy disk drive 266 interfaces with the computer 264 for data storage and retrieval. The disk drive 266 enables an operator to program the main processor 264 from program disks read into the computer 264 by the floppy disk drive 266. Once programmed, the main processor 264 controls the system 200 to perform a variety of tests utilizing various test methodologies. Data points including flow rates, temperatures and pressures are sensed and may then be written to floppy disks for the purpose of providing documentary evidence of compliance with various test methods some of which are prescribed by state and Federal laws.

The RS232 input-output port 268 is provided for data retrieval, connecting a printer for printing test information, or for connecting an external computer for programming the main processor 264.

The dry gas meter 11 measures the flow rate and flow volume of the fluid sample drawn through the probe 222 by the pump 104 and provides an output signal indicative of the flow rate and flow volume from the transducer 70. The output signal is sent to the main processor 264 via a second I/O processor 270 which communicates with the main processor 264 through a second instrument bus 272. The fluid outlet 20 of the dry gas meter 11 communicates with an optionally provided orifice flow meter 260. The orifice flow meter 260 is a back-up flow meter for providing the fluid flow rate of the fluid sample drawn through the probe 222. The high pressure side of the flow meter 260 communicates with the dry gas meter 11. The low pressure side of the flow meter 260 discharges to the environment. The pressure drop across the orifice flow meter 260 is measured by pressure transducers, the outputs of which are monitored by the main processor 264 via the second I/O processor 270 and communicated over the second instrument bus 272.

While the preferred embodiment includes all electrical components and electronic processor based totalization and elapsed time measurements, electromechanical analogs for sensing the rotation of the hub 66 and totalizing and timing the rotation are contemplated and are within the scope of the invention. Thus, mechanical digital or analog counters, which are common counting apparatuses used with dry gas meters, may be adapted to the hub 66 to totalize the revolutions of the hub 66. The instantaneous angular velocity of the hub 66 may be determined electromechanically by providing an electro-generator, adapted to the crank hub 66, and an electric meter such as a permanent magnet moving coil meter, responsive to the electric signal generated by the electro generator. When the electrogenerator is turned by the crank hub 66 thereby generating an electric current proportional to the rotational velocity of the hub 66, the meter is energized and provides an indication of the rotational velocity and therefore the volume flow rate of the gas pumped by the dry gas meter 11.

Operation of the Measuring and Controlling Systems

The operation of the flow rate measuring and controlling apparatus 10 is best described by first describing the operation of the modified dry gas meter 11 when used as a flow rate measuring and controlling device. Then the operation of the flow rate measuring and controlling system 10 embodied in the fluid sampling system 200 will be described.

Referring to FIG. 1, a flow of gas which is to be measured and controlled, air for example, is provided at the inlet 18 of the dry gas meter 11, typically through a conduit attached to the gas inlet 18. The gas outlet 20 may open to atmosphere or may be connected by a conduit to direct the gas passing through the meter 11 to a destination. A pressure differential is established between the inlet 18 and the outlet 20, with the pressure being higher at the inlet.

Metering chamber 15a is filled with gas which has forced the diaphragm 24 to its farthest position in chamber 15b. The valve gate 42 has just moved to place the inlet conduit 36 in communication with the outlet conduit 46, which is in communication with the meter outlet 20. In this configuration the gas in chamber 15a can be expelled to the outlet 20. The valve gate 42 has also placed the inlet conduit 38 in communication with the meter inlet to allow gas to begin to enter chamber 15b. As chamber 15b is filled with gas through conduit 38 the diaphragm will be forced into chamber 15a thereby pumping the gas residing in chamber 15a out of chamber 15a and through the inlet conduit 36. The movement of the diaphragm 24 will cause linkage 54 to rotate through a related angular displacement. The rod 58 which is rigidly attached to linkage 54 couples the diaphragm motion into the three-bar mechanism 62 and causes crank hub 66 to rotate as indicated, clockwise. Although the linkages 52 and 54 and the linkage rods 56 and 58 only reciprocate, that is they move only through arcuate motion less than 360° both clockwise and counter-clockwise, the crank hub 66 rotates only clockwise through full and continuous 360° degree rotation.

The diaphragm 22, which separates the chamber 14, is shown moving into chamber 14b thereby forcing gas from chamber 14b as chamber 14a is filled with gas introduced through inlet conduit 32. The valve gate 40 is disposed to place the outlet conduit 44 in communication with the inlet conduit 34 and to place the inlet conduit 32 in fluid communication with the meter inlet 18. The movement of the diaphragm 22 into the chamber 14b is followed by the linkage 52 which causes rod 56 to rotate thereby actuating the three-bar mechanism 64 which causes the crank hub 66 to rotate clockwise in complement to the motion of the three-bar mechanism 62.

It will be noted that the points of connection of the three-bar mechanisms 62 and 64 to the crank hub 66 are displaced approximately 90 degrees about the crank hub 66. This is done to prevent the valve gates 40 and 42 from stalling in an open or closed position and to regulate the output of gas from the meter outlet 20 so that the output flow appears to be constant rather than pulsed. A graphical representation of the output flow volume of gas as a function of time for a dry gas meter 11 pumping at a constant rate is shown in FIG. 3a.

The position of the diaphragms 22 and 24 as a function of time are shown graphically in FIG. 3b. Thus it can be seen that a fixed volume of gas, which will be referred to as a unit volume of gas, is always delivered for one complete cycle of the diaphragms 22 and 24. Referring to FIG. 3a, it can be seen that the volume of gas for a cycle equals the sum of the area under the curves representing the output flow volume. This area, and thus the volume represented by the area, will always be equivalent for any full cycle of diaphragm motion regardless of the points in the cycle at which the beginning and ending points are measured. This equivalence is shown by the pairs of lines L1 and L2 which designate cyclic movement of the diaphragms, shown in FIG. 3b, measured from different beginning and ending points in the cycle. The area under the output flow volume curves bounded by the pair of lines L1 is equal to the area under the volume flow curves bounded by the pair of lines L2.

A cyclic motion of the diaphragms corresponds to a single rotation of the crank hub 66 and, as explained above, a single rotation of the encoder transducer 70. A single rotation of the encoder transducer 70 provides an output of 32 successive pulses. Therefore, a unit volume of gas is delivered during the diaphragm movement corresponding to any 32 consecutive encoder transducer pulses, and remains constant regardless of the particular pulse designated as a first pulse.

The actual volume and flow rate of gas pumped depends on the size of the pump and the pressure differential applied across the gas inlet and outlets, 18 and 20. In a system for measuring gas flow rate of gases drawn from an industrial exhaust stack, for which the dry gas volumetric flow controlling system of the present invention is particularly well suited, a typical range falls into the range of 0.1 to 1.5 cubic feet per minute (CFM). In this operating flow range, the dry gas meter exhibits a less than 1% variation in flow accuracy.

The transducer encoder output signal is transmitted by the cable 78 to the processor 80. The cycle averaging circuit 82 counts the total number of pulses in the output signal to determine the total number of cyclic movements of the diaphragms 22 and 24. The number of cyclic movements of the diaphragms 22 and 24 is multiplied by a constant which represents the unit volume of gas metered by the diaphragms 22 and 24 in any cycle to determine the total volume of gas metered at any given time. The results of this calculation may be displayed on the readout 86.

The pulse timer circuit 84 measures the pulse time period between successive pulses transmitted by the encoder transducer 70. The pulse time period is measured each time the edge detector circuit 81 detects the rising edge of a first encoder square wave pulse at which point the clock counter is read and cleared yielding the time interval since the last pulse was detected. By way of an algorithm residing in the main processor 264 or the cycle averaging circuit 82 of the flow rate measuring and controlling apparatus 10, the measured pulse time period is inserted as an entry into a table of prior pulse time periods. The table has the same number of pulse time period entries as the number of pulses in one gas meter cycle. A table pointer, which points to the insertion point used, is incremented each time a new pulse time period entry is inserted so that successive pulse time periods are put into corresponding table insertion points. When the table pointer passes the last insertion point entry the pointer is reset to point at the first insertion point entry. After each entry, a new flow rate is calculated by dividing the gas meter unit volume by the sum of all table pulse time periods. The gas flow rate measurement is then displayed on the processor readout 86. Thus, the table comprises thirty-two successive pulse time periods which correspond to one cycle of the diaphragms 22 and 24 and the metering of a gas meter unit volume of gas. It should be noted that the gas flow rate is not measured on the basis of the elapsed time between individual pulses because the volume of gas displaced within that incremental time varies across the diaphragm cycle. The gas flow rate measurement is then displayed on the processor readout 86.

After the initial gas flow rate measurement is calculated and displayed, a moving average gas flow rate is calculated each time the table pointer is reset. Resetting the pointer allows the next group of 32 successive pulse time periods to be summed and then divide into the unit volume to obtain an updated fluid flow rate. This next group of pulses includes 31 of the past successive pulse time periods added to the most current pulse time period. Thus, the most distant pulse time period (the first pulse time period of the prior group of 32 successive pulse time periods) is dropped from the table and the most recent pulse time period is added to the table and is summed with the 31 pulse time periods remaining in the table. This process is repeated to provide an updated gas flow rate measurement thirty-two two times per cyclic motion of the diaphragms 22 and 24. Since a 32 pulse displacement always correlates to the metering of the same volume of gas, the non-linearity of the gas flow rate from pulse to pulse does not affect the accuracy of the flow rate calculation. Also, the resulting volume flow rate calculations are for the ambient conditions of the sample. Correction to a standard test condition, wherein sample temperatures and pressures are prescribed, may be provided by applying a calibration factor to the flow rate and total volume calculations. This calibration factor is applied by the cycle averaging circuit 82 before the flow calculation circuit 85 or to the resulting flow rate calculation in the flow rate calculation circuit 85.

The processor electrical output signal, which corresponds to the real time gas flow rate and total flow volume, is transmitted to the controller 100. The flow error calculation circuit 102 of the controller 100 receives the processor output signal and compares it to the programmed setpoint flow rate in the flow error calculation circuit 102 and generates a flow error signal. The flow error signal is communicated to the power controller 106 which modifies the DC voltage powering the pump 104. As the real-time gas flow rate approaches the setpoint flow rate, the flow error signal approaches zero at which point the DC voltage signal will remain unchanged to maintain the pumping rate of the pump 104.

If a fixed volume of gas is desired to be metered, that volume is programmed as a setpoint into the flow error calculation circuit 102 of the controller 100. The processor 80 totalizes the total number of transducer pulses in the cycle averaging circuit 82. Then the total volumetric flow for a given number of pulses totalized in the averaging circuit 82 is calculated in the flow calculation circuit 85. The total volume calculation is then transmitted to the controller 100 from the processor 80. The flow error calculation circuit 102 compares the actual total volume flow calculated by the flow calculator circuit 85 to the setpoint flow volume. The flow error calculation circuit 102 compares the actual flow volume and the desired flow volume and, when the actual flow volume equals the setpoint flow volume, a flow error signal is sent to the power controller 106 instructing the power controller 106 to turn the DC voltage to the pump 104 off to stop the pump 104.

Considering now the operation of the fluid sampling system 200 of FIG. 4, the flow rate and flow volume control system 10, which incorporates a dry gas meter 11, is configured to draw a fluid sample through the probe assembly 210 under an operating regimen controlled by the main processor 264. The particular sampling regimen is programmed into the main processor 264 either via a program loaded through the floppy drive 266 or by way of an external computer adapted to input a program via the RS232 interface 268. User entries, including test date and other identifying and initialization information, may be entered through the keyboard display 265 or entered automatically from readings provided by the temperature and pressure transducers of the probe assembly 210, the sample extraction assembly 212 and the flow rate measuring and controlling apparatus 10.

The sampling regimen is commenced when the processor 264 causes the pump 104 to begin pumping and drawing a flow of gas sample through the entry orifice 228 of the probe 222. As described above, the pumping rate of the pump 104 is controlled by the flow rate measuring and controlling apparatus 10 so that the gas flow rate equals the setpoint flow rate. The setpoint flow rate is determined by a program value or can be inputted manually through a keyboard entry via the display keyboard 265 or via the RS232 port 268 by an external computer communicating with the port 268.

The temperature of the gas sample is maintained in the probe assembly 210 by the probe heater jacket 224. The temperature of the probe heater jacket is maintained through an automatic control loop controlled by the main processor 264, which is well known. The gas sample travels through the filter assembly 238 where particulate is removed by the filter. The gas sample continues through the condenser housing where the gas is cooled through the series of impingers 250 which causes condensable fluids to condense to liquids which are collected in the impingers 250.

The gas sample continues to be drawn through the first snubber which helps reduce the pulsation caused by the single diaphragm vacuum pump 104. The gas sample proceeds from the pump through a second snubber, which similarly smoothes the sample flow, and then through the dry gas meter 11. The gas sample exits the dry gas meter 11 and enters the orifice meter 260. The gas flow rate measurement associated with the pressure drop across the orifice meter 260 is measured by sensors adapted to measure the height of a hydraulic fluid of a fluid manometer (not shown) having one end of the manometer tube opened to the orifice meter upstream of the meter constriction and the other end of the manometer tube located downstream of the meter constriction.

While the sample is being drawn, the dry gas meter 11 provides encoder transducer pulse information to the main processor 264 and this information is used as described above to draw the gas sample at a controlled rate per the sample regimen. The gas sample flow is halted when the actual flow volume rate equals the preset flow volume rate setpoint and instructs the pump 104 to stop pumping. Alternatively, the software loaded into the main processor 264 may define a total flow volume setpoint and, when this setpoint is reached, the main processor 264 causes the pump 104 to stop pumping.

After the procedure has been conducted and the pump 104 shuts down, the particulate and liquid sample are retrieved from the filter 238 and condenser assembly, respectively, for later analysis. The sampling procedure can then be repeated.

The control program entered into the main processor 264 includes a subroutine that accommodates large changes in flow rate that may result from surging gas in the stack S. Flow rate surges may also result when the source of gas is an independently pressurized gas source and the pressure of the pressurized gas source surges.

The flow rate required is set so that the linear velocity of gas entering the sampling nozzle equals the linear velocity of the stack effluent passing the nozzle. To determine the linear velocity at the nozzle, an S type pitot tube is used. This device is used by measuring the pressure differential between its upstream and downstream ports. The pressure is related by a function involving stack pressure, temperature and average molecular weight to the linear velocity. From the calculated gas velocity, a flow rate is calculated using the diameter of the sampling nozzle as the area through which the gas passes at the calculated linear velocity. The multiplication of linear velocity and nozzle area yields the flow rate at stack conditions. The flow rate at stack conditions is adjusted to compensate for the fact that all water vapor is removed from the stack gas in the cold box section of the sampling assembly. The flow rate is also adjusted for the difference in temperature and pressure between the stack and the dry gas meter at which the flow is measured.

The non-linearity of the encoder output as a function of the diaphragm position, particularly during the dwell of the valve gates while the valve gates are reversing flow, may be compensated for by providing an eccentric gear between the crank hub 66 and the transducer encoder shaft 76. By providing the eccentric gear, the volume flow per incremental movement of the diaphragm will be equal for each incremental diaphragm movement.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. An apparatus for measuring a volumetric fluid flow rate of a fluid, said apparatus comprising:
    a fluid meter comprising
        a housing having a fluid inlet and a fluid outlet and an internal chamber defined within said fluid meter housing,
        a diaphragm disposed within said housing separating said internal chamber into opposed metering chambers and mounted for reciprocating movement within said chamber,
        a valve for placing said fluid inlet and said fluid outlet selectively in fluid communication with said metering chambers alternately in response to a fluid entering said fluid inlet and exiting said fluid outlet, and
        a diaphragm linkage mechanically interconnected to said diaphragm, said diaphragm linkage including an output shaft which is rotatable in response to the reciprocation of said diaphragm, and
        a rotary encoder operatively engaged with said output shaft, said rotary encoder being capable of resolving the rotation of said output shaft into a plurality of successive angular displacements, each successive angular displacement of said output shaft corresponding to a position of each of said diaphragms within said internal chambers, said rotary encoder providing an encoder output signal for indicating a prescribed angular displacement of said output shaft when said diaphragm moves from one position to at least a second position within said internal chamber of said fluid meter when fluid passes from said fluid inlet to said fluid outlet thereby causing said diaphragm to reciprocate; and
    processor means responsive to said encoder output signal, said processor means being capable of determining said volumetric flow rate of fluid pumped by said fluid meter between a first angular displacement of said output shaft and at least a second angular displacement of said output shaft and capable of determining a moving average of said volumetric fluid flow rate of fluid pumped by the fluid meter for each successive angular displacement of said output shaft.

2. An apparatus for controlling a volumetric fluid flow rate of a fluid, said apparatus comprising:
    a fluid meter comprising
        a housing having a fluid inlet and a fluid outlet and an internal chamber defined within said fluid meter housing,
        a diaphragm disposed within said housing separating said internal chamber into opposed metering chambers and mounted for reciprocating movement within said chamber,
        a valve for placing said fluid inlet and said fluid outlet selectively in fluid communication with said metering chambers alternately in response to a fluid entering said fluid inlet and exiting said fluid outlet, and
        a diaphragm position indicator interconnected to said diaphragm to provide an indication of the position of said diaphragm within said chamber when said fluid passes from said fluid inlet to said fluid outlet thereby causing said diaphragm to reciprocate:
    processor means responsive to said diaphragm position indicator for determining said volumetric flow rate of said fluid pumped by said fluid meter between said diaphragm in a first position and said diaphragm in at least a second position and further capable of providing a processor output indicative of said volumetric flow-rate of said fluid: and
    means for varying said volumetric flow rate of said fluid passing through said fluid meter in response to said volumetric flow rate of said fluid indicated by said processor output comprising a fluid flow valve in fluid communication with said fluid meter internal chambers for selectively manually controlling the fluid pressure differential between said fluid inlet and said fluid outlet of said fluid meter.

3. An apparatus for controlling a volumetric fluid flow rate of a fluid, said apparatus comprising;
    a fluid meter comprising
        a housing having a fluid inlet and a fluid outlet and an internal chamber defined within said fluid meter housing,
        a diaphragm disposed within said housing separating said internal chamber into opposed metering chambers and mounted for reciprocating movement within said chamber
        a valve for placing said fluid inlet and said fluid outlet selectively in fluid communication with said metering chambers alternately in response to a fluid entering said fluid inlet and exiting said fluid outlet,
        a diaphragm linkage mechanically interconnected to said diaphragm, and
        a diaphragm position transducer operatively engaged with said diaphragm linkage, wherein said diaphragm linkage mechanically transmits diaphragm position information to said transducer and said diaphragm position transducer provides a transducer output signal useful for indicating the position of said diaphragm as said diaphragm reciprocates with said internal chamber when said fluid passes from said fluid inlet to said fluid outlet;
    processor means responsive to said transducer output signal for determining said volumetric fluid flow rate of fluid pumped by said fluid meter between said diaphragm in a first position and said diaphragm in at least a second position and further capable of providing a processor output signal indicative of the flow rate; and
    means for varying said volumetric fluid flow rate of said fluid passing through said fluid meter in response to said volumetric fluid flow rate indicated by said processor output signal comprising
    comparator means, responsive to said processor output signal, for comparing said volumetric fluid flow rate of said fluid pumped by said fluid meter, and for generating a pressure control signal proportional to the difference between said volumetric fluid flow rate of said fluid pumped by said fluid meter and a desired volumetric fluid flow rate to be pumped by said fluid meter and
    pressure control means responsive to said pressure control signal for varying the fluid pressure differential of said fluid between said fluid inlet and said fluid outlet of said fluid meter thereby varying the volumetric fluid flow rate through said fluid meter so that said volumetric fluid flow rate of said fluid pumped by said fluid meter becomes equivalent to said desired volumetric fluid flow rate to be pumped by said fluid meter.

4. The apparatus of claim 3 wherein said pressure control means comprises a pump adapted to pump a gas under positive pressure at said gas inlet relative to said gas outlet to cause the gas to be pumped by said gas meter and wherein said pump is adapted to provide a variable gas flow at a variable gas flow pressure in response to said pressure control signal of said comparator means.

5. The apparatus of claim 3 wherein said pressure control means comprises a valve adapted to vary the fluid pressure differential between said gas inlet and said gas outlet of said gas meter to vary the flow rate of gas pumped by said gas meter in response to said pressure control signal of said comparator means.

6. A method of measuring the volumetric fluid flow rate of a fluid comprising the steps of:
  (a) flowing a fluid through a reciprocating diaphragm fluid meter for a periodic reciprocation of a diaphragm of said reciprocating diaphragm fluid meter thereby metering a unit volume flow of fluid through said fluid meter;
  (b) monitoring the position of said diaphragm of said reciprocating diaphragm fluid meter as said diaphragm reciprocates in response to said fluid passing through said fluid meter;
  (c) determining a time elapsed for a periodic reciprocation of said diaphragm comprising the substeps of
    (c1) resolving the movement of said diaphragm into a plurality of N incremental movements the sum of which is equal to a periodic movement of said diaphragm,
    (c2) determining a time elapsed between each of said plurality of N successive movements of said diaphragm within said periodic movement of said diaphragm, and
    (c3) summing said time elapsed between each of said plurality of N incremental movements of said diaphragm to determine said elapsed time for said periodic movement of said diaphragm;
  (d) dividing said unit volume flow of fluid pumped within said sum of said N incremental movements of said diaphragm by said sum of said time elapsed of said plurality of N incremental movements to determine an average volumetric fluid flow rate; and
  (e) indicating said average volumetric fluid flow rate in a useable format.

7. A method of controlling a volumetric fluid flow rate of a fluid comprising the steps of:
  (a) flowing said fluid through a reciprocating diaphragm fluid meter for at least one periodic reciprocation of a diaphragm of said reciprocating diaphragm fluid meter thereby metering at least one unit volume flow of fluid through said fluid meter;
  (b) monitoring the position of said diaphragm of said reciprocating diaphragm fluid meter as said diaphragm reciprocates in response to said fluid passing through said fluid meter;
  (c) determining the elapsed time for said at least one periodic reciprocation of said diaphragm comprising the substeps of:
    (c1) resolving the movement of said diaphragm into a plurality of N incremental movements the sum of which is equal to a periodic movement of said diaphragm;
    (c2) determining a time elapsed between each of the N successive movements of said diaphragm within said periodic movement of said diaphragm;
    (c3) summing said elapsed time of said plurality of N incremental movements of said diaphragm to determine said elapsed time for said periodic movement of said diaphragm; and
  (d) dividing the unit volume of fluid pumped within said sum of said incremental movements of diaphragm motion by said sum of said elapsed time of said plurality of N incremental movements to determine an average volumetric fluid flow rate of fluid pumped through said gas meter
  (e) indicating said average volumetric fluid flow rate in a usable format;
  (f) comparing said average volumetric fluid flow rate to a desired volumetric fluid flow rate; and
  (g) varying the flow of fluid into said reciprocating diaphragm fluid meter so that said average volumetric fluid flow rate equals said desired volumetric fluid flow rate.

8. The method of claim 7 further including the steps of:
after (c2) further including the steps of
  (c4) determining the time elapsed between the last incremental movement of the plurality of N movement in a periodic movement of the diaphragm and the next incremental movement of the diaphragm, and
  (c5) summing the elapsed time of the incremental movement determined in step (c4) with the previous N-1 most temporally recent incremental movements to provide a sum of the elapsed time for the most recent N incremental movements; and
wherein step (d) includes calculating a moving average of the volumetric flow rate by successively repeating steps (b) through (d).

* * * * *